US008268068B2

(12) United States Patent
Van Zutphen et al.

(10) Patent No.: US 8,268,068 B2
(45) Date of Patent: Sep. 18, 2012

(54) METAL-POLYMER COORDINATION COMPLEX INCORPORATING PHOSPHORUS ATOMS AND APPLICATIONS USING SUCH A COMPLEX

(75) Inventors: Steven Van Zutphen, La Ville Du Bois (FR); Nicolas Mezailles, Saint Maurice Montcouronne (FR); Pascal Le Floch, Orsay (FR)

(73) Assignees: Ecole Polytechnique, Palaiseau (FR); Centre National de la Recherche Scientifique, Paris (FR)

( * ) Notice: Subject to any disclaimer, the term of this patent is extended or adjusted under 35 U.S.C. 154(b) by 62 days.

(21) Appl. No.: 12/405,853

(22) Filed: Mar. 17, 2009

(65) Prior Publication Data
US 2010/0068143 A1 Mar. 18, 2010

Related U.S. Application Data (63) Continuation-in-part of application No. PCT/EP2008/062298, filed on Sep. 16, 2008.

(30) Foreign Application Priority Data

Sep. 17, 2007 (FR) ...................................... 07 57637

(51) Int. Cl.
C09K 17/02 (2006.01)
(52) U.S. Cl. .................... 106/287.29; 428/403; 428/404; 428/405; 428/406; 428/407; 524/588; 528/398
(58) Field of Classification Search .................... 524/588
See application file for complete search history.

(56) References Cited

U.S. PATENT DOCUMENTS

| | | | | |
|---|---|---|---|---|
| 2,237,045 A * | 4/1941 | Booth et al. | ................... | 424/601 |
| 2,772,188 A * | 11/1956 | Reeves et al. | ................... | 427/341 |
| 2,810,701 A * | 10/1957 | Reeves et al. | ............... | 427/393.3 |
| 3,035,053 A * | 5/1962 | Coates et al. | ................... | 544/84 |
| 3,142,663 A * | 7/1964 | Niebergall | ..................... | 526/227 |
| 3,221,057 A * | 11/1965 | Gordon et al. | .................. | 568/13 |
| 3,248,429 A * | 4/1966 | Baranauckas et al. | .......... | 568/13 |
| 3,404,022 A * | 10/1968 | Chance et al. | ................ | 427/342 |
| 3,499,842 A * | 3/1970 | Carlson | .......................... | 252/180 |
| 3,625,738 A * | 12/1971 | Donaldson et al. | ............ | 427/353 |
| 3,655,573 A * | 4/1972 | Carlson | .......................... | 252/180 |
| 3,953,165 A | 4/1976 | Pepperman, Jr. et al. | | |
| 4,027,084 A | 5/1977 | Tkatchenko | | |
| 4,048,324 A * | 9/1977 | Kohn | ............................ | 514/500 |
| 4,071,501 A | 1/1978 | Pepperman, Jr. et al. | | |
| 4,157,313 A | 6/1979 | Conan et al. | | |
| 4,166,897 A | 9/1979 | Umetani et al. | | |
| 5,376,142 A * | 12/1994 | Matthews et al. | ............. | 8/94.18 |
| 5,691,436 A * | 11/1997 | Blount | ............................ | 528/26 |
| 5,948,386 A | 9/1999 | Katti et al. | | |
| 6,540,790 B2 * | 4/2003 | Collins et al. | ................. | 8/94.1 R |
| 6,827,745 B1 * | 12/2004 | Jones et al. | ..................... | 8/94.21 |

FOREIGN PATENT DOCUMENTS

| | | |
|---|---|---|
| FR | 1 583 037 | 10/1969 |
| FR | 1 583 037 A | 10/1969 |
| FR | 2 277 103 A | 1/1976 |
| FR | 2 277 103 A1 | 1/1976 |
| GB | 761985 A * | 11/1956 |
| GB | 1 238 703 | 7/1971 |
| GB | 1 238 703 A | 7/1971 |
| GB | 1 517 552 A | 7/1978 |
| WO | WO 96/30056 A1 | 10/1996 |
| WO | WO 2009/037251 A2 | 3/2009 |

OTHER PUBLICATIONS

Berning et al., "In Vitro and In Vivo Characterization of a $^{99m}$Tc Complex with Tris(hydroxymethyl)phosphine (THP)," *Nuclear Medicine & Biology*, vol. 23, No. 5, pp. 617-622, 1996.
International Search Report issued in International Application No. PCT/EP2008/062298; Mailed on Jan. 7, 2010 (With Translation).
Berning et al., "In Vitro and In Vivo Characterization of a $^{99m}$Tc Complex with Tris(hydroxymethyl)phosphine (THP)," *Nuclear Medicine and Biology*, vol. 23, No. 5, pp. 617-622, Jul. 1, 1996.
Tramontini et al., "Further Advances in The Chemistry of Mannich Bases," *Tetrahedron*, vol. 46, No. 6, pp. 1971-1837, 1990.
Rosi et al., "Nanostructures in Biodiagnostics," *Chemical Reviews*, vol. 105, No. 4, pp. 1547-1562, 2005. French Search Report issued in French Application No. 0757637; Completed on Jul. 21, 2008.
Jun. 18, 2009 European Search Report issued in Application No. 09305242.1.
McCloskey et al., Magpie Polymers-Selective Metal Capture, "Mine Water and Innovative Thinking," IMWA 2010, Sydney, NS, pp. 47-50.

* cited by examiner

*Primary Examiner* — Robert S Loewe
(74) *Attorney, Agent, or Firm* — Oliff & Berridge PLC

(57) ABSTRACT

The invention relates to a compound comprising at least one polymeric chain incorporating phosphorus atoms and consisting, in all or in part, of identical or different repeated units, each of said units being represented by the following formula:

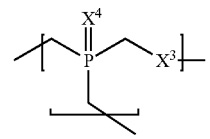

wherein $X^3$ represents —[Si(O$_2$)]—; or —O—[Si(R$^1$R$^2$)O]— with R$^1$ and R$^2$ being, independently of each other, a $C_1$-$C_{30}$ alkyl or alkoxy group, a $C_5$-$C_{30}$ aryl group; or a mono- or polyorganosilicate derived radical; or —N(R$^3$)— with R$^3$ being —H, a $C_1$-$C_{30}$ alkyl group or a $C_5$-$C_{30}$ aryl group, optionally substituted with —OH or —NH$_2$, or at least one unit of general formula (I), and =X$^4$ represents an electron pair, =O, =S, =NR$^4$ with R$^4$ representing a $C_1$-$C_{30}$ alkyl group or a $C_5$-$C_{30}$ aryl group, =Se or =Te, and its use for complexing metal atoms.

27 Claims, 2 Drawing Sheets

Solution containing metal atoms

Purified solution

FIGURE 1

Reactants → Products

METAL-POLYMER COORDINATION COMPLEX INCORPORATING PHOSPHORUS ATOMS AND APPLICATIONS USING SUCH A COMPLEX

This is a Continuation-in-Part of Application No. PCT/EP2008/062298 filed Sep. 16, 2008. This application also claims the benefit of French Patent Application No. 07 57637 filed Oct. 13, 2008. The disclosures of the prior applications are hereby incorporated by reference herein in their entirety.

The invention relates to compounds comprising at least one polymeric chain incorporating phosphorus atoms. Polymers able to coordinate metallic ions are advantageously used in a variety of applications. In particular the compounds of the invention may be advantageously used in the coordination chemistry, in particular for capturing and complexing metal atoms.

More particularly, the compounds according to the invention may be obtained from tris(hydroxymethyl)phosphine (THP), or the likes.

Phosphines, phosphines oxide, phosphines sulphide, phosphines selenide, phosphines telluride or iminophosphoranes are already used in a great diversity of ligands able to stabilize transition metal atoms. Furthermore, those functional groups have already been incorporated in polymeric matrices, through the functionalization of polysiloxane, polystyrene or polyethylene glycol type polymers.

For example, tris(hydroxymethyl)phosphine (THP) grafted on a silica-polysiloxane support (U.S. Pat. No. 4,157, 313) were used for complexing metal atoms.

However, those compounds have, usually, a low amount of functional groups per gram of polymer.

Besides, the solubility of those compounds and their processes of preparation depend upon both of the nature of the polymer and of the nature of the functional groups. In fact, up to now, there is no simple, cheap, versatile and easily synthesized polymeric compound comprising repeated unit containing phosphorus atoms able to complex metal atoms with a high yield and which may be used in various fields as water purification, medical imaging, or chemical catalysis available.

However, it is known that hydroxymethylphosphorus compounds condense readily with amines, amides, urea, and other nitrogen-containing compounds to yield linear and branched polymers. Such compounds are used in flame retarding cotton-cellulose.

For example, in U.S. Pat. Nos. 3,953,165 and 4,071,501 phosphorus-containing condensation products have been proposed for treating textile articles to impart them flame retardant properties. In U.S. Pat. No. 4,166,897 a process for obtaining a water-soluble phosphorus-containing condensation products containing methylene and methyl-ether type links type for treating fabrics to give them flame-retardant properties is described. U.S. Pat. No. 5,948,386 discloses conjugates obtained by cross-linking one molecule with another with the reaction of hydroxymethylphosphine (HMP) with primary or secondary amine.

However, none of those polymeric compounds or materials has been proposed for complexing metal atoms.

There is a need for polymers able to bind high amount of metal atoms, in particular transition metal atoms, and to be stable over a wide range of pH.

There is a need for versatile polymers, water-soluble or insoluble, or soluble in organic solvents, preferably obtained through a unique, simple, fast and cheap process using non toxic solvents, and in particular using water.

There is a need for a versatile polymer able to complex metal atoms, in particular transition metal atoms, which may be used for purifying water, in medical imaging or as catalytic agent.

The current invention has for purpose to meet theses needs.

According to one aspect, the present invention concerns with the use of a compound comprising at least one polymeric chain, said polymeric chain incorporating phosphorus atoms and consisting, in all or in part, of identical or different repeated units, each of said units being represented by the following formula (I):

wherein:
X$^3$ may represent:
—[Si(O$_2$)]—, or
—O—[Si(R$^1$R$^2$)O]— with R$^1$ and R$^2$ being, independently of each other, a C$_1$-C$_{30}$ alkyl or alkoxy group, a C$_5$-C$_{30}$ aryl group, or
a mono or polyorganosilicate derived radical, or
—N(R$^3$)— with R$^3$ being —H, a C$_1$-C$_{30}$ alkyl group or a C$_5$-C$_{30}$ aryl group, optionally substituted with —OH or —NH$_2$, or at least one unit of general formula (I), and
=X$^4$ may represent an electron pair, =O, =S, =NR$^4$ with R$^4$ representing a C$_1$-C$_{30}$ alkyl group or a C$_5$-C$_{30}$ aryl group, =Se or =Te, for complexing metal atoms.

Within the invention, the terms "polymer" and "polymeric chain" are used interchangeably.

According to one embodiment, the invention relates to a compound comprising at least one polymeric chain as disclosed here above liable to be obtained according to a method comprising at least the step of contacting a first reactant P(CH$_2$Z)$_3$, wherein each Z represents, independently of each other, —OH or —CH$_2$OH, with a second reactant comprising at least two reactive sites chosen from "NH" and "SiOH", wherein each reactive site is liable to react with one first reactant, wherein said first reactant and said reactive sites are used in an amount equal or greater than 1 and more particularly ranging from 1 to 1.4 equivalents, and more preferably ranging from 1.1 to 1.3 equivalents.

According to a specific embodiment, a compound of the invention comprises a linear polymeric chain.

According to another specific embodiment, a polymer of the invention may have a tri-dimensional structure comprising several polymeric chains according to the invention.

More particularly, a polymer of the invention may be cross-linked.

According to an embodiment, the invention relates more particularly to the use of at least one a compound of the invention comprising at least one polymeric chain as above-defined for complexing metal atoms from a solution, such as water, in particular in the form of dissolved metal atoms.

An embodiment of the invention relates to a water-purifying device comprising at least one compound of the invention.

According to another embodiment, the invention relates to the use of at least one a compound of the invention comprising at least one polymeric chain as above-defined for detecting metal atoms.

In another particular embodiment, the invention relates to a compound comprising at least one polymeric chain, said polymeric chain incorporating phosphorus atoms and being represented by the following formula (II);

(II)

wherein n, B, $X^1$, $X^2$, $X^3$ and $=X^4$ are as defined hereafter.

The polymers of the invention are particularly interesting with respect to their ability to bind metal atoms, in particular transition metal atoms, through coordination bonds resulting in high specificity and selectivity.

The complexed metal atoms of the invention may be in the form of ions or metal oxide, or neutral metal species.

As stated here-after a polymer of the invention may comprise as functional group having electron pairs a great diversity of groups that may be chosen from groups of trialkylphosphine type, trialkylphosphine oxide type, trialkylphosphine sulphide type, trialkylphosphine selenide type or trialkylphosphine telluride type or iminophosphorane type.

Therefore the choice of a convenient polymer according to the metal with which a bond may be formed may be easily made in order to bind therein one metal atom rather than another.

By way of example, copper (I) or (II) ions will preferably be complexed with phosphine type polymer, whereas zirconium (IV) ions will preferably be complexed with phosphine oxide type polymer.

Thus, according to another aspect the invention relates to a metal-based coordination complex comprising at least one metal atom complexed via coordination bonds with at least one compound of the invention.

The current invention relates, according to another embodiment, to a stabilized nanoparticle of metal atoms, in particular of aggregated metal atoms, coated at least in part with at least one compound of the invention.

Another embodiment of the invention relates to a compound for medical imaging comprising at least one metal-based coordination complex of the invention or at least one stabilized nanoparticle of metal atoms of the invention, in particular of aggregated metal atoms.

Another embodiment of the invention relates to a catalytic agent comprising at least one metal-based coordination complex of the invention or comprising at least one stabilized nanoparticle of metal atoms of the invention, in particular of aggregated metal atoms.

Polymer

A compound of the invention comprises at least one polymeric chain incorporating phosphorus atoms.

A compound according to the invention comprises at least one polymeric chain which incorporates phosphorus atoms and which may consist, in all or in part, of identical or different repeated units, each of said units may be represented by the following formula (I):

(I)

wherein:
  $X^3$ may represent:
    —[Si(O$_2$)]—, or
    —O—[Si(R$^1$R$^2$)O]— with R$^1$ and R$^2$ being, independently of each other, a $C_1$-$C_{30}$ alkyl or alkoxy group, a $C_5$-$C_{30}$ aryl group, or
  a mono- or polyorganosilicate derived radical, or
    —N(R$^3$)— with R$^3$ being —H, a $C_1$-$C_{30}$ alkyl group or a $C_5$-$C_{30}$ aryl group, optionally substituted with —OH or —NH$_2$, or at least one unit of general formula (I), and
  $=X^4$ may represent an electron pair, $=$O, $=$S, $=$NR$^4$ with R$^4$ representing a $C_1$-$C_{30}$ alkyl group or a $C_5$-$C_{30}$ aryl group, $=$Se or $=$Te, for complexing metal atoms.

Within the meaning of the invention, "alkyl" intends to mean linear, branched, cyclic, saturated or unsaturated alkyl radicals.

Within the meaning of the invention, "alkoxy" intends to mean a radical —OR wherein R represents a linear, branched, cyclic, saturated or unsaturated alkyl radical.

Within the meaning of the invention, "aryl" intends to mean monocyclic or polycyclic, condensed or not, radical. According to an embodiment, an aryl group of the invention may be a 5-30 members heteroaryl group, i.e. an aryl group comprising one or more heteroatom such as O, S or N interrupting its hydrocarbon chain.

According to one embodiment, $R^1$, $R^2$, $R^3$ and $R^4$ may, independently of each other, represent a linear, branched or cyclic, saturated or unsaturated, $C_1$-$C_{30}$ alkyl group, in particular a $C_2$-$C_{20}$, more particularly a $C_3$-$C_{18}$, more particularly a $C_4$-$C_{16}$ and more particularly a $C_8$-$C_{12}$ alkyl group, or a $C_5$-$C_{30}$ aryl group, and in particular a $C_{10}$-$C_{20}$, and more particularly a $C_{14}$-$C_{18}$ aryl group, or 5-30 members heteroaryl group, and in particular 10-20 members, and more particularly 14-18 members heteroaryl group.

According to another embodiment, $R^1$ and $R^2$ may, independently of each other, represent a linear, branched or cyclic, saturated or unsaturated, $C_1$-$C_{30}$ alkoxy group, in particular a $C_2$-$C_{20}$, more particularly a $C_3$-$C_{18}$, more particularly a $C_4$-$C_{16}$ and more particularly a $C_8$-$C_{12}$ alkoxy group.

According to a preferred embodiment, $X^3$ may represent —N(R$^3$)— where R$^3$ is different from H.

According to a preferred embodiment, $R^3$ may represent an alkyl or an aryl or an heteroaryl group as above-defined, optionally substituted with at least one radical chosen from OH or $NH_2$, and in particular with OH.

In particular, $R^3$ may represent a $C_1$-$C_6$, more particularly a $C_2$-$C_5$, and more particularly, a $C_3$-$C_4$ alkyl group, optionally substituted with at least one radical chosen from OH or $NH_2$, and in particular with OH.

According to a preferred embodiment, $R^3$ may represent at least one unit of general formula (I). In such embodiment, the free extremities of a unit figured by formula (I) which are not engaged in the polymeric chain may be substituted with $X^1$ or $X^2$ as defined below.

Preferably, $R^3$ may figure a radical comprising repeated units figured by formula (I). The number of repeated units may range from 1 to $10^6$, preferably from 10 to $10^5$, and more preferably from 100 to $10^4$. The repeated units of formula (I) figuring $R^3$ may represent a polymeric chain.

$R^3$ may figure a linear, branched or cross-linked polymeric chain. Owing to the structure of the repeated unit of formula (I), the branches of the polymeric chain figured by $R^3$ may be represented by at least one unit of formula (I), and preferably by repeated units of formula (I). The number of repeated units may be as above-defined,

According to one embodiment each $X^3$ moiety of each repeated unit may be different or identical one relative to each other.

According to a preferred embodiment, $=\!X^4$ may represent $=\!O$, $=\!S$, or an electron pair, and more particularly may be an electron pair.

According to one embodiment each $X^4$ moiety of each repeated unit may be different or identical one relative to each other.

Preferably, a polymeric chain of the invention may comprise at least two, preferably three and more preferably four different repeated $X^4$ moieties.

Advantageously, a polymeric chain of the invention may be represented by the following formula (II):

(II)

wherein:
n may range from 1 to $10^6$, in particular from 10 to $10^5$, and more particularly from 100 to $10^4$,
$X^3$ and $=\!X^4$ may be as above-defined, with each $X^3$ being identical to each other when n is greater than 1, and when $X^3$ represents $-\!NHR^3\!-$ with $R^3$ being at least one unit of general formula (I) then the free extremities of said at least one unit which are not engaged in said polymeric chain are substituted with $X^1$ or $X^2$ as defined below,
$X^1$ and $X^2$ may represent, independently of each other, $-\!OH$, $NH_2$, $-\!NHR^5$, or $-\!SiR^6R^7(OH)$, with $R^5$, $R^6$ and $R^7$ being, independently of each other, a $C_1$-$C_{30}$ alkyl group or a $C_5$-$C_{30}$ aryl group, or $R^6$ being as previously defined and $R^7$ figuring $-\!OCH_2\!-\!B$, with B representing a radical of formula (III):

(III)

wherein:
m may range from 0 to $10^6$, in particular from 10 to $10^5$, and more particularly from 100 to $10^4$, and
B' may represent B, with each B being identical to each other when m is different from 0,
$X'^2$ may represent $X^2$ as above-defined, $X'^3$ may represent $X^3$ as above-defined and $=\!X'^4$ may represent $=\!X^4$ as above-defined, with each $X'^3$ being identical relative to each other when m is different from 0.

According to one embodiment, $R^5$, $R^6$ and $R^7$ may, independently of each other, represent a linear, branched or cyclic, saturated or unsaturated, $C_1$-$C_{30}$ alkyl group, in particular a $C_2$-$C_{20}$, more particularly a $C_3$-$C_{18}$, more particularly a $C_4$-$C_{16}$ and more particularly a $C_8$-$C_{12}$ alkyl group, or a $C_5$-$C_{30}$ aryl group, and in particular a $C_{10}$-$C_{20}$, and more particularly a $C_{14}$-$C_{18}$ aryl group.

According to another embodiment $R^6$ may be as above-defined and $R^7$ may figure $-\!OCH_2\!-\!B$, with B being as above defined.

According to one embodiment, $X^1$ and $X^2$ may represent, independently of each other, $-\!OH$, $-\!NHR^5$, or $-\!SiR^6R^7(OH)$, with $R^5$, $R^6$ and $R^7$ being as above defined.

In a particular embodiment, the invention has for object a compound comprising at least one polymeric chain of formula (II) wherein n, B, $X^1$, $X^2$ and $X^3$ are as previously defined and $=\!X^4$ is $=\!O$, $=\!S$ or an electron pair, and with each $X^3$ being identical relative to each other when n is greater than 1.

More preferably, a compound according to the invention may comprise at least one polymeric chain represented by the following formula (IV):

(IV)

wherein n, $X^1$, $X^2$, $X^3$ and $=\!X^4$ are as above-defined.

According to another embodiment, a compound according to the invention may comprise at least one polymeric chain represented by the following formula (V):

(V)

wherein:

n, $X^1$, $X^2$, $X^3$ and $=X^4$ may be as above-defined, $n_1$, $n_2$ and $n_3$ may range, independently of each other, from 0 to $10^6$, in particular from 10 to $10^5$, and more particularly from 100 to $10^4$, and $a_1$ and $a_2$ may range from 1 to $10^6$, in particular from 10 to $10^5$, and more particularly from 100 to $10^4$,

$-//-$ figures an optional continuation of said polymeric chain, and

A, B, C and D may be randomly or sequentially distributed.

According to another embodiment, a compound according to the invention may be as above-defined with $X^1$ and $X^2$ being identical.

According to one embodiment, a polymer of the invention may preferably comprise at least one polymeric chain comprising at least one group chosen from groups of trialkylphosphine type, trialkylphosphine oxide type, trialkylphosphine sulphide type, trialkylphosphine selenide type or trialkylphosphine telluride type or iminophosphorane type, and more preferably chosen from trialkylphosphine type or trialkylphosphine oxide type.

A polymer of the invention may, in particular, have one of the following formulae (VI), (VII), (VIII) or (IX):

(VI)

(VII)

(VIII)

(IX)

wherein, B, $=X^4$, $R^1$, $R^2$, $R^3$, $R^5$ and n are as above-defined.

According to an embodiment, a compound of the invention may comprise at least one polymeric chain as previously defined where X1 and X2 represent —$NH_2$, X3 represents —NH— or —$NR^3$— with $R^3$ being of formula (I), and $=X4$ represents an electron pair; or where X1 and X2 represent —$NH_2$, X3 represents —NH— or —$NR^3$— with $R^3$ being of formula (I), and $=X4$ represents $=O$; or where X1 and X2 represent —$NHC_8H_{17}$, X3 represents —$N(C_8H_{17})$—, and $=X4$ represents an electron pair; or where X1 and X2 represent —$NHC_{12}H_{25}$, X3 represents —$N(C_{12}H_{25})$—, and $=X4$ represents an electron pair.

According to another embodiment, a compound according to the invention may be insoluble in water. The solubility of a compound of the invention may be determined by any known techniques in the art.

According to another embodiment, a compound of the invention may be grafted onto a support of mineral or organic material.

As example of mineral material suitable for the invention, one may mention material chosen from the group consisting of a metal oxide such as $TiO_2$ or $SiO_2$.

The grafting of a compound of the invention onto a mineral material may be carried by any known methods in the art.

For example, after an activation of the mineral surface of the support, by, for example, oxygen plasma treatment or pyrolysis, the monomer THP only, or THP in the presence of a second reactant such as an amine, for example $NH_4OH$, is presented to the mineral material. Reaction of the monomer with surface MOH (where M is the metal for example Si or Ti) and subsequent reaction of the second and third $CH_2Z$ groups on the monomer with other MOH groups or with the other second reactant will lead to the formation of polymers grafted to the mineral material.

As example of organic material suitable for the invention, one may mention organic material chosen from the group consisting of cellulose fibers, paper, plastic, mineral materials functionalized with APS or the like, amine containing reagent, amine containing organic polymer, or biological amine containing polymers such as polylysine.

The grafting of a compound of the invention onto an organic material may be also carried by any known methods in the art.

For example, the monomer THP only, or THP in the presence of a second reactant such as an amine, for example NH$_4$OH, is presented to the organic material. Reaction of the monomer with surface amines and subsequent reaction of the second and third CH$_2$Z groups on the monomer with other surface amines or with the other second reactant will lead to the formation of polymers grafted to the organic material In one embodiment, a support onto which a compound of the invention may be grafted may be in the form of a particle or a bead, or may be a surface or the surface of devices such as a wall of a channel or a microchannel, or a micro or macroporous material.

Metal-Based Coordination Complex

An object of the present invention is a metal-based coordination complex, comprising at least one metal atom and at least one compound of the invention, the said metal atoms being bound to the polymer of the invention via coordination bonds.

Typically, a metal-based coordination complex of the invention comprises a polymer comprising groups which may in particular be based on phosphorus comprising groups capable of developing Lewis acid-Lewis base bonds with metal atoms and thus opens the way to numerous applications.

In a complex of the invention, a metal atom may be in the form of an oxide or a salt or a neutral solvate species.

A metal-based coordination complex of the invention may be obtained by reacting a compound of the invention with a salt or an oxide of the metal atom or another solvate species to be complexed in order to obtain the expected complex or one of its salts with an appropriate counter-ion.

Metal atoms that may be complexed with a compound of the invention may be, for example, an oxide or a salt or a neutral solvate of a paramagnetic metal of atomic number 21-29, 42-44 or 58-70 (for example, scandium, titanium, vanadium, chromium, manganese, iron, cobalt, nickel, copper, molybdenum, ruthenium, cerium, praseodymium, neodymium, promethium, samarium, europium, gadolinium, terbium, dysprosium, holmium, erbium, thulium, and ytterbium; the elements Gd(III), Mn(II), europium and dysprosium are particularly preferred), or a radionuclide chosen from $^{99}$Tc, $^{117}$Sn, $^{111}$In, $^{97}$Ru, $^{67}$Ga, $^{68}$Ga, $^{89}$Zr, $^{177}$Lu, $^{47}$Sc, $^{105}$Rh, $^{188}$Re, $^{60}$Cu, $^{62}$Cu, $^{64}$Cu, $^{67}$Cu, $^{90}$Y, $^{159}$Gd, $^{149}$Pr, and $^{166}$Ho, or an ion of a heavy metal of atomic number 21-31, 39-49, 50, 56-80, 82, 83 or 90.

In particular, metal atoms convening for the invention may be chosen from Ti, V, Cr, Mn, Fe, Co, Ni, Cu, Zn, Y, Zr, Hf, Nb, Mo, Cd, Ta, W et Re; and rare earth metal such as La, Ce, Pr, Nd, Sm, Eu, Tb, Th, Dy and U, or noble or platinum group metals chosen from Pb, Pd, Pt, Au, Ru, Os, Ag, Rh, or Ir.

Advantageously, a complex according to the present invention may comprise an metal atom or an ion of a paramagnetic metal chosen from Gd$^{3+}$, Mn$^{2+}$ and Fe$^{3+}$.

According to one embodiment, a metal-based coordination complex may comprise a compound of the invention comprising at least one polymeric chain comprising at least trialkylphosphine groups and metal atoms rich in electrons, such as for example platinum.

According to another embodiment, a metal-based coordination complex may comprise a compound of the invention comprising at least one polymeric chain comprising at least phosphine oxide groups and metal atoms poor in electrons, such as for example zirconium.

According to another embodiment, the metal atoms may be in the form of nanoparticles, or part of said nanoparticles, stabilized by at least one compound of the invention. Within the meaning of the invention, the term "nanoparticle" is intended to mean assemblies of atoms of nanometric size. In a particular embodiment, a nanoparticle of the invention may be made of aggregated metal atoms.

Nanoparticles may be pure metal nanoparticles, such as group XI metal centers (Au, Ag, or Cu) or a binary mixture of metal atom and another element such as luminescent semiconductors (group II-VI or III-V, such as InP for example).

Advantageously, metal nanoparticles of the invention may comprise Au nanoparticles, often used in biodiagnostics as described by Rosi & Mirkin in Chem. Rev., 2005, 105: 1547.

Applications

As stated previously, the present invention relates to the use of a compound of the invention for very different applications which relate to the field of coordination chemistry.

These applications are highly varied and relate in particular to the field of catalysis, the field of the extraction or recycling of metals, and in particular metal atoms, the field of detecting and analysing metal atoms, the field of the stabilization of nanoparticles, the field of catalysis as well as the field of medical imaging.

Thus, the present invention relates to the use of at least one compound of the invention, in particular comprising at least one polymer obtained from tris(hydroxymethyl)phosphine (THP), for their intrinsic properties of forming bonds with metal atoms, in particular with transition metal atoms.

Extraction, Recycling or Detection of Metals

The coordination chemistry of metal atoms has numerous applications, such as the extraction and recycling of metal atoms, and in particular transition metal atoms.

In these fields, the aim is to form scavengers for metals, generally in solution. For this, the aim is to find entities capable of easily forming bonds with metals atoms and then to recover said metals atoms. According to the invention, when a polymer-metal complex has been formed by Lewis base-Lewis acid interactions, it is possible to recover the metal atoms by filtration or extraction.

Therefore, the current invention has for object the use of a compound as above-defined for complexing metal atoms. In particular, a use of the invention may be carried out on metal atoms present in a solution, such as an aqueous solution.

An aspect of the invention relates to a use of a compound of the invention for purifying a solution, and in particular an aqueous-solution such as wasted-water.

In a preferred embodiment, a use of the invention may be carried out for complexing metal atoms from water.

Accordingly, another subject-matter of the invention is a method for purifying a solution presumed comprising metal atoms comprising at least the steps consisting of:
  introducing a compound according to the invention into a solution presumed comprising metal atoms in conditions suitable for obtaining at least one complex of metal-polymer type,
  removing said complex from the solution, for example by centrifuging or filtering, and
  recovering said solution substantially devoid of metal atoms.

Within the meaning of the invention, "substantially" intends to mean that the solution treated according to the invention does not comprise any longer detectable amount of dissolved metal atoms, as it may be detected with usual methods known in the field.

Figure 1:
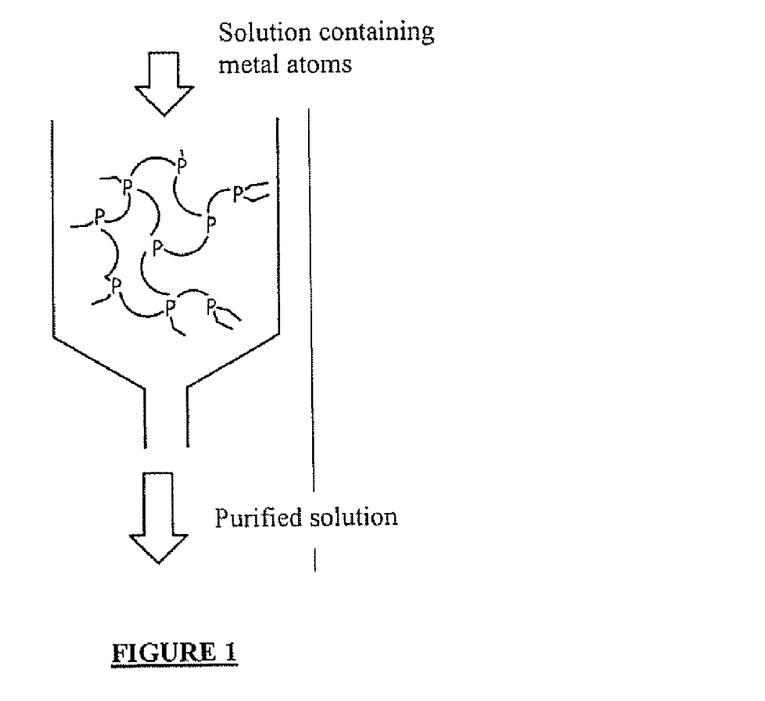
FIG. 1 diagrammatically represents a purification process comprising a complex according to the invention.

FIG. 1 illustrates, as such, an example of a reaction scheme used during the purifying method of the invention, using a complex of the invention and a solution loaded with dissolved metal particles.

A first solution comprising solubilised metal atoms under the form of metal oxide or metal salt is introduced into a medium comprising a compound of the invention resulting in the formation of a second solution. This second solution is filtered, making it possible to isolate, on the filter, the compound-metal complex formed in situ in the second solution and allowing the passage of a solution purified from metal atoms.

Such a purification method is particularly direct and no longer requires the use of resins generally employed according to the known art.

In numerous applications of the waste treatment type, for example radioactive waste treatment type, there is a need to extract metal entities such metal atoms. For this, a compound of the invention may be contacted with a solution comprising such entities. The metal-based complex obtained is then recovered, for example by filtration or centrifugation, and then heated at a temperature at which the organic species decompose, in order to collect the metal.

Such a process is particularly advantageous in so far as it is very direct and in so far as it makes it possible to treat large amounts of entities to be recycled.

An aspect of the invention relates to a use of a compound of the invention for recycling metal atoms.

Therefore, a further subject-matter of the invention is a method for recycling metal atoms comprising at least the steps consisting of:
  providing a solution comprising metal atoms,
  introducing in said solution a compound according to the invention in conditions suitable for obtaining at least one complex of metal-polymer type,
  removing said complex from the solution, for example by centrifuging or filtering,
  recovering said metal atoms from said complex, for example by dissolving said complex.

According to one embodiment, the recovering step may be carried by heating the solution comprising said complex to a temperature greater than the decomposition temperature of the compound of the invention so as to obtain a mixture of decomposed products.

The recovering of said metal atoms may be further carried by filtration of said mixture of heated and decomposed products.

It is then easy and inexpensive to recover the metal atoms by dissolution or by incinerating the combination at a temperature at which the organic species decompose.

An aspect of the invention relates to a use of a compound of the invention for detecting metal atoms, Therefore, another subject-matter of the invention is a method for detecting a solution presumed comprising metal atoms comprising at least the steps of:
  introducing a compound according to the invention into a solution presumed comprising metal atoms in conditions suitable for obtaining at least one complex of metal-polymer type,
  recovering said complex from the solution, for example by centrifuging or filtering, and
  detecting the metal atoms in said complex.

The detecting step may be carried out in situ in said complex or after a step of extracting the metal atoms from said complex. The extracting step may be carried out for example by heating said complex to a temperature greater than the decomposition temperature of the compound of the invention as indicated above.

The step of detecting may be carried out by any techniques known in the art, for example by spectroscopy.

Advantageously, after the step of introducing a compound of the invention in a solution and before the step of removing the said complex, a method of the invention may comprise a step of altering the pH of said solution, either by lowering or by increasing said pH in order to improve the precipitation of said complex.

Preferably the pH may be lowered. The modification of the pH of a solution may be carried out by any techniques known in the art, for example by introducing a base or an acid in said solution.

According to an embodiment, a compound of the invention that may be used in the above-described methods may preferably comprise a polymer comprising repeated units of trialkylphosphine type, of trialkylphosphine oxide type, of trialkylphosphine sulphide type, of trialkylphosphine selenide type, of trialkylphosphine telluride type, or of iminophosphorane type.

According to an embodiment, the formation of a complex of metal-polymer type may be carried out either by introducing a first solution presumed comprising metal atoms into a second solution comprising a compound of the invention or by introducing a compound of the invention in a solid form in a solution presumed comprising metal atoms.

The conditions are suitably selected according to routine tasks by a skilled artisan in the art so that bonds are formed between a polymer of the invention and the metal atoms.

According to a preferred embodiment, a compound of the invention that may be used in the methods of the invention may be grafted onto a support as above indicated.

According to another preferred embodiment, a compound of the invention may be grafted or bound to a surface for example of a device, a bead or a particle. The support brings advantages in terms of handling of the compound, pressure drop properties of a filtering device, and easy of separation of the complex from the solution.

According to one embodiment, the present invention relates to a filtering-device comprising at least one compound of the invention. Such filtering-device may be preferably used for water purification.

For example, a compound of the invention may be placed on a filter with a pore size smaller than the particle size of the compound of the invention. Water presumed to contain metal atoms can than be flowed through the device allowing the formation of coordination bonds between the compound of the invention and the metal atoms. Water presumed devoid of selected metal atoms is then recovered at the end of the filter.

Catalytic Agent

Another object of the invention is the use of a coordination complex according to the invention as catalytic agent, or catalyst, for chemical synthesis.

According to one of its object, the invention relates to a catalytic agent comprising at least one metal-based complex of the invention or comprising at least one stabilized nanoparticle of metal atoms of the invention, in particular one nanoparticle of aggregated metal atoms.

In the field of catalysis, the advantage of the polymer-metal centres combination is that of lying at the boundary between homogeneous catalysis and heterogeneous catalysis. This is because the polymer-metal centres combination can be chosen for its solubility in a given solvent, which makes it possible to carry out a reaction in a homogeneous phase. There thus exists good contact between the catalyst and the solution, the surface of the polymer conferring a defined electron and steric environment to the metal which makes possible high activity and selectivity.

Therefore, compounds of the present invention present the advantage of being soluble in various solvents, including water or an organic solvent, such as toluene, while being easy to isolate so as to be able to be removed at the end of a chemical reaction.

An advantage the invention is that a soluble compound of the invention may be more easily precipitated or else extracted with a selected solvent from a reaction medium than a conventional, homogeneous catalytic agent.

According to another embodiment, the invention relates to a chemical synthesis method comprising at least a step of reacting at least two reactants in presence of at least one catalytic agent of the invention.

In preferred embodiments, metal atoms which may be advantageously used in a catalytic agent of the invention may be chosen from Pd, Pt, Rh, Ru, Co, Fe, Ni or another suitable transition metal species or combination thereof.

Figure 2:
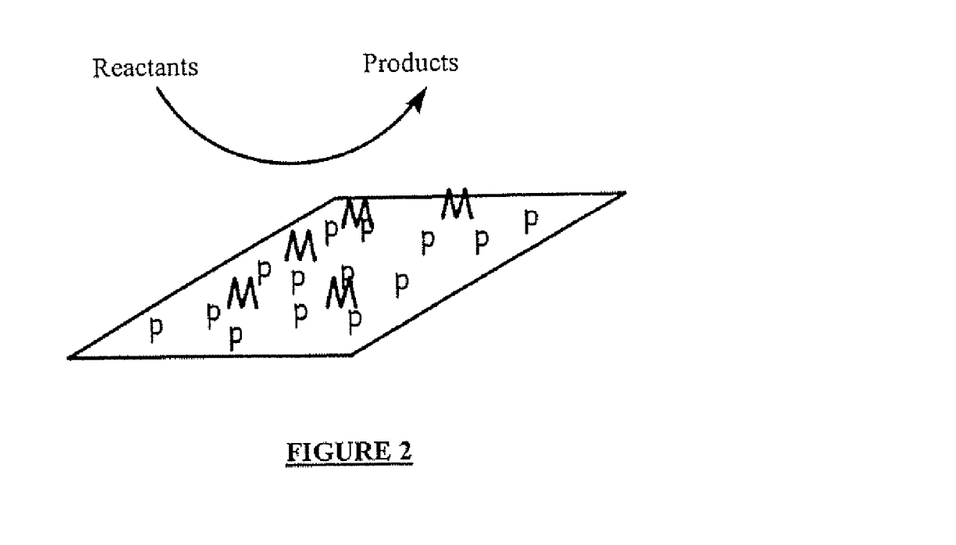
FIG. 2 diagrammatically represents a chemical synthesis method using, as catalytic agent, a complex according to the invention.
Figure 3:
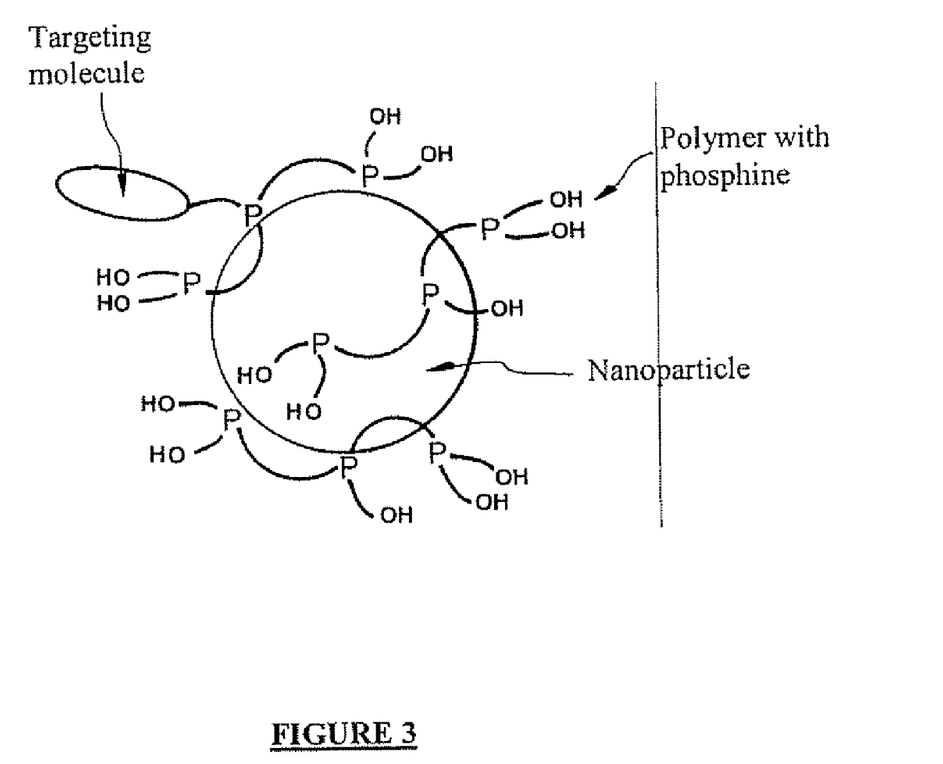
FIG. 3 diagrammatically represents a complex comprising metal atoms in the form of nanoparticles and capable of creating bonds with a target entity.

As illustrated in FIG. 2, a compound of the invention is introduced into a solution comprising reactants in the presence of metal atoms M as catalytic precursor. It can typically be a metal salt in solution. The polymer and the catalytic precursor form a catalytic complex.

The reaction between reactants takes place in the presence of the catalytic complex. It is possible to combine the advantages of a catalytic agent which is soluble in the reactive medium and the possibility of isolating said catalytic agent at the end of the reaction by filtration or by extraction with solvents.

Medical Imaging

Another object of the invention is the use of a metal-based coordination complex according to the invention or of a stabilized nanoparticle of metal atoms of the invention, in particular of aggregated metal atoms, as a compound for medical imaging, and in particular as contrast agent.

Today, one of the major hurdles in medical imaging relates to the solubility of nanoparticles, as "marker", in biological media. This is mainly because nanoparticles are synthesized in organic solvents and have low-water solubility properties whereas it is an absolute necessity to obtain an adequate level of dissolution of those nanoparticles in water, and in particular in biological fluids such as blood. The already considered techniques of attaching water-soluble ligands to those nanoparticles, which are complex and expensive, have not yet provided satisfying results.

The coordination chemistry of polymers based on phosphines also has particularly advantageous applications in the field of medical imaging using nanoparticles of metal atoms, in particular of aggregated metal atoms.

Accordingly, a further subject-matter of the invention is a compound for medical imaging, in particular a contrast agent, comprising a metal-based coordination complex according to the invention or a stabilized nanoparticle of metal atoms of the invention, in particular of aggregated metal atoms.

Advantageously the compound of the invention for medical imaging is water soluble.

In preferred embodiments, metal atoms which may be advantageously used in medical imaging may be chosen from nanoparticles of metals of group X1 (Ag, Au or Cu, for example) or nanoparticles of semi-conductors II-VI or III-V.

According to one embodiment, a compound of the invention may be modified with functional reacting groups capable of creating bonds with a support of biological type, in particular with biomolecule.

As functional reacting groups one may mention the radical —$CH_2OH$ which may be a substituent of phosphorus atoms incorporated in a polymer of the invention.

Compounds of the invention comprising groups of trialkylphosphine type, trialkylphosphine oxide type, trialkylphosphine sulphide type, trialkylphosphine selenide type, trialkylphosphine telluride type exhibit the great advantage of being soluble, depending on the substituents of the amine, in solvents and in particular in water.

According to one embodiment, the invention relates to a method of preparing water-soluble stabilised nanoparticles of metal atoms, in particular of aggregated metal atoms, for medical imaging comprising at least the steps of:
providing a solution comprising dissolved metal atoms as metal precursors,
contacting said solution with least one compound of the invention in conditions suitable for the aggregating of said metal precursors into nanoparticles and the coating of said nanoparticles with said polymer.

It is of routine tasks for a skilled artisan to select suitable conditions for obtaining the aggregation of the metal precursors according to the nature of said metal precursor, For example, a gold ($Au^{3+}$) solution may be reduced with an excess of sodium borohydride at room temperature in the presence of the polymer, resulting in the formation of the desired polymer stabilized Au nanoparticles.

Alternatively, a method of the invention may comprise at least the steps of:
providing a solution comprising solubilised preformed nanoparticles,
contacting said solution with at least one compound of the invention comprising at least one polymeric chain of the invention, in conditions suitable for the coating of said nanoparticles with said compound.

The nanoparticles thus obtained may comprise about ten, twenty or more preferably thirty to about four or five thousand metal atoms, in particular as aggregated metal atoms.

One advantage of the method of the invention is the formation in situ of nanoparticles coated with compounds of the invention.

According to another embodiment, a method of the invention may comprise at least a step of preparing nanoparticles of metal atoms, in particular of aggregated metal atoms, a step of coating said nanoparticles with "monodentate" ligands to obtain stabilized nanoparticles, a step of contacting said stabilized nanoparticles with a compound of the invention, preferably in solution, to obtain the replacement of the "monodentate" ligands by "polydentate" ligands composed of said compound.

Said method allows advantageously providing simultaneously the nanoparticles with stabilization and dissolution functions.

Preparation of Compounds

The current invention proposes also to a method for synthesizing a compound of the invention incorporating phosphines groups.

As starting material providing phosphine groups one may use the tetra(hydroxymethyl)phosphonium chloride, [$P(CH_2OH)_4$]Cl (THP), which may be transformed into a first reactant, tris(hydroxymethyl)phosphine, $P(CH_2OH)_3$, called THP, using a variety of bases or reducing agents, such as sodium hydroxide, ammonia or an organic base such as triethylamine. Advantageously, a tris(hydroxymethlyl)phosphine (THP) group may be obtained by neutralizing tetra(hydroxymethyl)phosphonium chloride with sodium hydroxyde (NaOH).

The different compounds considered according to the invention may be obtained by reaction, in particular by co-polymerization, of the first reactant with a second reactant intended to provide the group X3 considered in the formulae of the polymer of the invention.

A second reactant suitable for the invention may comprise at least two reactive sites, each liable to react with one first reactant in conditions suitable for reacting, in particular co-polymerizing, the first reactant with the second reactant. A reactive site suitable for the invention may be in particular chosen from "NH" or "SiOH".

According to an embodiment, the two requested reactive sites may be borne in one nucleophilic moiety or may be borne in two distinct nucleophilic moieties. A nucleophilic moiety may comprise at least one reactive site, preferably two reactive sites, more preferably three and more preferably four reactive sites.

Within the meaning of the invention, a reactive site is intended to figure all or part of a nucleophilic moiety able to enter in a reaction with a first reactant.

A nucleophilic moiety may be chosen from NH, $NH_2$, $NH_3$, $NH_4^+$, SiOH or $Si(OH)_2$.

A nucleophilic moiety such as NH comprises only one reactive site "NH", and in such case the nucleophilic moiety figures the reactive site in its whole. Furthermore in such a case the second reactive site requested according to the invention will have to be provided by another nucleophilic moiety present in said second reactant so as to allow the reaction, and in particular the co-polymerization, of a first reactant with a second reactant.

By contrast, the nucleophilic moiety $NH_2$ comprises directly two reactive sites "NH", $NH_3$ comprises three reactive sites "NH", $NH_4^+$ comprises four reactive sites "NH", SiOH comprises one reactive site "SiOH" and $SiOH_2$ comprises two reactive sites "SiOH".

A second reactant suitable for the invention may be chosen from $NH_2R$ with R representing a $C_1$-$C_{30}$ alkyl or alkoxy group, optionally substituted with —OH or —$NH_2$, or a $C_5$-$C_{30}$ aryl group; silica derivatives such as $SiY_nZ_p$, with n+p=4, and Y figuring a radical chosen from Cl, OH or EtO, and Z figuring a radical chosen from a $C_1$-$C_5$ alkyl group or a $C_5$-$C_{30}$ aryl group. In particular, a second reactant may be chosen from $NH_2$—R—$NH_2$, NH(R)—R—$NH_2$, NH(R)—R—NH(R) with R representing a $C_1$-$C_{30}$ alkyl, alkoxy or alkylene group, optionally substituted with —OH or —$NH_2$, or a $C_5$-$C_{30}$ aryl or arylene group. Also, a second reactant may be $NH_3$, $NH_4OH$ or $NH_4Cl$.

According to a preferred embodiment, a first reactant, such as $P(CH_2Z)_3$, and a second reactant comprising the said reactive sites are used in amounts such that the first reactant and the reactives sites are in an amount equal or greater than 1, in particular ranging from 1 to 1.4 equivalents, and more preferably ranging from 1.1 to 1.3 equivalents.

The structure of a compound of the invention i.e. linear or tri-dimensional, cross-linked or not, as represented in formula (V) may be adjusted through the weight ratio between the first and second reactants.

A reaction according to the invention may be carried out in water when oxygen is present, without oxidation of THP. Only few intermediates are present.

More particularly, the preparation of a compound of the invention incorporating phosphines groups and amino groups, may comprise at least a step of reacting, as first reactant, a tris(hydroxymethyl)phosphine (THP) with, as second reactant, an ammonium group, a primary or a secondary amine.

The OH groups of THP react with amines according to a Mannich-type condensation reaction (Tetrahedron, 46, 1791, 1990).

When using secondary amine, $NHR_2$, three clearly defined products $(R_2NCH_2)P(CH_2OH)_2$, $(R_2NCH_2)_2P(CH_2OH)$ and $(R_2NCH_2)_3P$ may be formed depending on the added amine proportion.

Using primary amine, $NH_2R$, in the same reaction, the defined product $(RNHCH_2)_3P$ maybe isolated if the amine is added to great excess.

When a smaller amount of amine is used, polymer species form quickly.

The optimum ratio of THP/amine is 1 or more.

When using primary amine, solubility may be controlled by the nature R group of the $NHR_2$ group.

As example, with a phenyl-type R group, a compound of the invention may be soluble in acetone.

With a long-chain alkyl R group, a compound of the invention may be soluble in solvents, such as toluene or chloroform or THF (tetrahydrofuran).

With a polar R group, as for example —R'$CH_2COOH$, a compound of the invention may be soluble in water.

According to one embodiment, a compound of the invention incorporating phosphorus atoms, for example in the form of phosphines groups, may be obtained by reacting a primary amine with tris(hydroxymethyl)phosphine (THP) groups.

The reaction of one equivalent of $RNH_2$ yields a polymer having —$CH_2OH$ end extremities.

The reaction with amount greater than one equivalent of $RNH_2$ yields a polymer having —$CH_2NHR$ end extremities.

Regarding more particularly the preparation of a compound of the invention incorporating phosphines groups and silica groups, the method of the invention may comprise at least a step of reacting, as first reactant, a tris(hydroxymethyl) phosphine (TFP) with, as second reactant, silica derivatives such as $SiY_nZ_p$, with n+p=4, and Y figuring a radical chosen from Cl or EtO, and Z figuring a radical chosen from a $C_1$-$C_5$ alkyl group or a $C_5$-$C_{30}$ aryl group.

Excess reaction of $SiY_nZ_p$ (n=2) yields the following polymeric chain.

Excess reaction of $SiY_nZ_p$ (n=3) yields the following polymeric chain.

Excess reaction of $SiY_nZ_p$ (n=4) yields the following polymeric chain.

In the compounds obtained with the above-indicated method, $=X^4$ has the expected properties of transition metal atom coordination, that is to say a Lewis acid/Lewis base type interaction ($X^4$—metal centre).

A soluble compound according to the invention may be easily determined by NMR (nuclear magnetic resonance) and mass spectroscopy. The number of monomer units may thus be clearly defined and it allows demonstrating that it is typically possible to obtain oligomers comprising from 8 to 10 "monomeric" units.

The invention will be better understood and other advantages will become apparent on reading the description which will follow, given without implied limitation.

EXAMPLES

Synthesis of a Compound According to the Invention

In general, compounds according to the invention may be synthesized according to at least one of the following methods.

According to a first method, a solution is made with 25 g of tris(hydroxymethyl)phosphine (marketed THPC) in 250 mL of water, cooled to 0° C. An aqueous solution of NaOH is then added under stirring (5.7 g in 100 mL of water). The reaction is completed within 5 minutes after the end of the addition of the base, as shown by the total disappearance of the feedstock's signal (+25 ppm in NMR $^{31}P$) and the appearance of the end product's signal THP at −25 ppm.

The reaction mixture then contains an equimolar proportion of THP and $CH_2O$ (formaldehyde).

In a second step, carried out in the same vessel, the mixture is allowed to react with the desired amine derivative.

According to a second method, a solution is made with marketed THPC, water and a suitable amount of amine derivative.

Example 1

Compound Comprising a Polymer P1 Wherein X1 and X2 Represent —$NH_2$, X3 Represents —NH or —$NR^3$— with $R^3$ Being of Formula (I), and =X4 Represents an Electron Pair A polymer synthesis is carried out using marketed THPC (80% mass in $H_2O$) Treated as Above-Indicated.

Solid ammonium salt $NH_4Cl$ (6.1 g) is added to the mixture.

The obtained polymer P1 precipitates very quickly in a quantitative way. It is insoluble in usual organic solvents.

Example 2

Compound Comprising a Polymer P2 Wherein X1 and X2 Represent —$NH_2$, X3 Represents —NH or —$NR^3$— with $R^3$ Being of Formula (I), and =X4 Represents =O At the end of the preceding synthesis, the obtained suspension is allowed to react with $H_2O_2$ (6 mL in 40 mL of water) during 1 hour. The resulting solid, i.e. the obtained polymer P2, is rinsed with water and dried.

Example 3

Compound Comprising a Polymer P3 Wherein X1 and X2 Represent —$NHC_8H_{17}$, X3 Represents —$NC_8H_{17}$, and =X4 Represents an Electron Pair According to the first method, the mixture obtained at the end of the first step from 2.39 g of THPC (10 mmol) is allowed to stoichiometrically react (1.5 equivalent compared with THP) with 2.48 mL of octylamine ($C_8H_{17}NH_2$). A precipitate forms 10 minutes after, this precipitate is centrifuged, rinsed with water, then with ethanol, and dried. This compound is soluble in organic solvents and is characterized by a signal at −60 ppm in NMR $^{31}P$.

Example 4

Compound Comprising a Polymer P4 Wherein X1 and X2 Represent —$NHC_{12}H_{25}$—, X3 Represents —$NC_{12}H_{25}$, and =X4 Represents an Electron Pair According to the first method, the mixture ($V_{total}$ $H_2O$=50 mL) obtained at the end of the first step from 2.39 g of THPC (10 mmol) is allowed to stoichiometrically react (1.5 equivalent compared with THP) with 2.77 g of dodecylamine ($C_{12}H_{25}HN_2$) diluted in 50 mL of toluene. This reaction is vigorously stirred overnight. The polymer is obtained after settling of both phases. The organic phase is vacuum dried, leaving an oily polymer characterized by a signal at −65 ppm in NMR $^{31}P$.

Example 5

Compound Obtained According to a Sol-Gel Reaction.

The compound is obtained as described in Example 1, but a silica precursor is used as second reactant.

Example 6

Synthesis of a Silica Supported Compound.

A silica supported polymer is made according to the same process as Example 1 but in the presence of silica that was previously heated at 500° C. overnight. The particle size is dependent of the silica gel used. Approximately, 10-20% of silica is used with respect to the THPC used.

The invention claimed is:

1. A method comprising a step of complexing metal atoms with a compound comprising at least one polymeric chain, said polymeric chain incorporating phosphorus atoms and comprising identical or different repeated units, said units being represented by the following formula (I):

(I)

wherein:
X$^3$ represents:
—O—[Si(R$^1$R$^2$)O]— with R$^1$ and R$^2$ being, independently of each other, a C$_1$-C$_{30}$ alkyl or alkoxy group, or a C$_5$-C$_{30}$ aryl group,
a mono- or polyorganosilicate derived radical, or
—N(R$^3$)— with R$^3$ being —H, a C$_1$-C$_{30}$ alkyl group, or a C$_5$-C$_{30}$ aryl group, optionally substituted with —OH or —NH$_2$, or at least one unit of general formula (I), and
=X$^4$ represents an electron pair, =O, =S, or =NR$^4$ with R$^4$ representing a C$_1$-C$_{30}$ alkyl group or a C$_5$-C$_{30}$ aryl group.

2. The method according to claim 1, wherein said polymeric chain is obtained according to a method comprising contacting a first reactant P(CH$_2$Z)$_3$ with a second reactant comprising at least two reactive sites selected from NH and SiOH, wherein:
each Z represents —OH,
each reactive site is capable of reacting with one first reactant, and
said first reactant and said reactive sites are used in an amount equal to or greater than 1 equivalent.

3. The method according to claim 2, wherein said second reactant is selected from:
NH$_2$R with R representing a C$_1$-C$_{30}$ alkyl group, optionally substituted with —OH or —NH$_2$, or a C$_5$-C$_{30}$ aryl group, and
silica derivatives.

4. The method according to claim 3, wherein said silica derivatives have the formula SiY$_n$Z$_p$, with n+p=4, Y represents OH, and Z represents a radical selected from the group consisting of a C$_1$-C$_5$ alkyl group and a C$_5$-C$_{30}$ aryl group.

5. The method according to claim 1, wherein said polymeric chain is represented by the following formula (II):

(II)

wherein:
n ranges from 1 to 10$^6$, each X$^3$ being identical to each other when n is greater than 1, and, when X$^3$ represents —NR$^3$— with R$^3$ being at least one unit of general formula (I), then free extremities of said at least one unit of general formula (I) which are not engaged in said polymeric chain are substituted with X$^1$ or X$^2$,
X$^1$ and X$^2$ independently represent:
—OH,
—NH$_2$,
—NHR$^5$ where R$^5$ represents a C$_1$-C$_{30}$ alkyl group or a C$_5$-C$_{30}$ aryl group, or
—OSiR$^6$R$^7$(OH) where:
R$^6$ represents a C$_1$-C$_{30}$ alkyl group or a C$_5$-C$_{30}$ aryl group, and
R$^7$ represents:
a C$_1$-C$_{30}$ alkyl group,
a C$_5$-C$_{30}$ aryl group, or
—OCH$_2$—B, and
B represents:
X$^2$ as defined above, or
a radical of formula (III):

(III)

wherein:
m ranges from 0 to 10$^6$, and
B' represents X$^2$ or a radical of formula (III) with each radical of formula (III) being identical to each other when m is not 0,
X$^{1'2}$ represents X$^2$ as above-defined, X$^{1'3}$ represents X$^3$ as above-defined, and =X$^{1'4}$ represents =X$^4$ as above-defined, with each X$^{1'3}$ being identical to each other when m is not 0.

6. The method according to claim 5, wherein X$^1$ and X$^2$ represent, independently of each other, —OH, —NHR$^5$, or OSiR$^6$R$^7$(OH).

7. The method according to claim 6, wherein said polymeric chain is represented by the following formula (V):

wherein:
   $n_1$, $n_2$ and $n_3$ range, independently of each other, from 0 to $10^6$, and
   $a_1$ and $a_2$ range from 1 to $10^6$,
   -//- represents an optional continuation of said polymeric chain, and
   A, B, C, and D are randomly or sequentially distributed.

8. The method according to claim 5, wherein $X^1$ and $X^2$ are identical.

9. The method according to claim 1, wherein said polymeric chain is represented by the following formula (IV):

where $X^1$ and $X^2$ represent, independently of each other, —OH, —NH$_2$, or —NHR$^5$, with R$^5$ being a C$_1$-C$_{30}$ alkyl group or a C$_5$-C$_{30}$ aryl group, and n ranges from 1 to $10^6$.

10. The method according to claim 1, wherein =X$^4$ represents =O, =S or an electron pair.

11. The method of claim 1, wherein said compound is insoluble in water.

12. The method according to claim 1, wherein said polymeric chain is grafted onto a support of mineral or organic material.

13. The method according to claim 12, wherein said support of mineral material is a metal oxide.

14. The method according to claim 13, wherein said metal oxide is TiO$_2$ or SiO$_2$.

15. The method according to claim 12, wherein said support of organic material is selected from the group consisting of cellulose fibers, paper, plastic, mineral materials functionalized with APS, amine containing reagent, amine containing organic polymer, and biological amine containing polymers.

16. The method according to claim 1, comprising complexing said metal atoms from water.

17. A method for detecting metal atoms comprising:
   complexing metal atoms according to claim 1;
   recovering a metal-polymer complex from a solution of the compound and metal atoms; and
   detecting metal atoms in said complex.

18. The method according to claim 1, wherein the metal atoms are selected from the group consisting of an oxide, a salt, a neutral solvate of a paramagnetic metal of atomic number 21-29, 42-44, or 58-70, a radionuclide chosen from $^{99}$Tc, $^{117}$Sn, $^{111}$In, $^{97}$Ru, $^{67}$Ga, $^{68}$Ga, $^{89}$Zr, $^{177}$Lu, $^{47}$Sc, $^{105}$Rh, $^{188}$Re, $^{60}$Cu, $^{62}$Cu, $^{64}$Cu, $^{67}$Cu, $^{90}$Y, $^{159}$Gd, $^{149}$Pr, and $^{166}$Ho, and an ion of a heavy metal of atomic number 21-31, 39-49, 50, 56-80, 82, 83, or 90.

19. A metal-based coordination complex comprising a metal atom complexed via coordination bonds with at least one compound comprising a polymeric chain, said polymeric chain incorporating phosphorus atoms and comprising identical or different repeated units, said units being represented by the following formula (I):

wherein:
   $X^3$ represents:
      —O—[Si(R$^1$R$^2$)O]— with R$^1$ and R$^2$ being, independently of each other, a C$_1$-C$_{30}$ alkyl or alkoxy group, or a C$_5$-C$_{30}$ aryl group,
      a mono- or polyorganosilicate derived radical, or
      —N(R$^3$)— with R$^3$ being —H, a C$_1$-C$_{30}$ alkyl group, or a C$_5$-C$_{30}$ aryl group, optionally substituted with —OH or —NH$_2$, or at least one unit of general formula (I), and
   =X$^4$ represents an electron pair, =O, =S, or =NR$^4$ with R$^4$ representing a C$_1$-C$_{30}$ alkyl group or a C$_5$-C$_{30}$ aryl group.

20. A compound for medical imaging comprising a metal-based coordination complex according to claim 19.

21. A catalytic agent comprising a metal-based coordination complex according to claim 19.

22. A stabilized nanoparticle of metal atoms coated at least in part with at least one compound comprising a polymeric chain, said polymeric chain incorporating phosphorus atoms and comprising identical or different repeated units, said units being represented by the following formula (I):

(I)

wherein:
X³ represents:
—O—[Si(R¹R²)O]— with R¹ and R² being, independently of each other, a $C_1$-$C_{30}$ alkyl or alkoxy group, or a $C_5$-$C_{30}$ aryl group,
a mono- or polyorganosilicate derived radical, or
—N(R³)— with R³ being —H, a $C_1$-$C_{30}$ alkyl group, or a $C_5$-$C_{30}$ aryl group, optionally substituted with —OH or —$NH_2$, or at least one unit of general formula (I), and
=X⁴ represents an electron pair, =O, =S, or =NR⁴ with R⁴ representing a $C_1$-$C_{30}$ alkyl group or a $C_5$-$C_{30}$ aryl group.

23. A compound for medical imaging comprising a stabilized nanoparticle of metal atoms according to claim 22.

24. A catalytic agent comprising a stabilized nanoparticle of metal atoms according to claim 22.

25. A water insoluble compound comprising a polymeric chain, said polymeric chain incorporating phosphorus atoms and being represented by the following formula (II):

(II)

wherein:
n ranges from 1 to $10^6$,
X¹ and X² independently represent:
—OH,
—$NH_2$,
—NHR⁵ where R⁵ represents a $C_1$-$C_{30}$ alkyl group or a $C_5$-$C_{30}$ aryl group, or
—OSiR⁶R⁷(OH) where:
R⁶ represents a $C_1$-$C_{30}$ alkyl group or a $C_5$-$C_{30}$ aryl group, and
R⁷ represents:
a $C_1$-$C_{30}$ alkyl group,
a $C_5$-$C_{30}$ aryl group, or
—$OCH_2$—B, and
B represents:
X² as defined above, or
a radical of formula (III):

(III)

wherein:
m ranges from 0 to $10^6$, and
B' represents X² or a radical of formula (III), with each radical of formula (III) being identical to each other when m is not 0, X'² represents X² as above-defined, X'³ represents X³ with each X'³ being identical to each other when m is not 0, and =X'⁴ represents =X⁴,
X³ represents:
—O—[Si(R¹R²)O]— with R¹ and R² being, independently of each other, a $C_1$-$C_{30}$ alkyl or alkoxy group, or a $C_5$-$C_{30}$ aryl group,
a mono- or polyorganosilicate derived radical, or
—N(R³)— with R³ being a $C_1$ or a $C_3$-$C_5$ alkyl group or a $C_5$-$C_{30}$ aryl group, optionally substituted with —OH or —$NH_2$, or at least one unit of general formula (I), wherein each X³ is identical to each other when n is greater than 1, and
X⁴ is an electron pair or =O.

26. The compound according to claim 25, wherein said polymeric chain is obtained according to a method comprising a step of contacting a first reactant $P(CH_2Z)_3$ with a second reactant comprising at least two reactive sites selected from the group consisting of NH and SiOH, wherein:
each Z represents —OH,
each reactive site is capable of reacting with one first reactant, and
said first reactant and said reactive sites are used in an amount equal or greater than 1 equivalent.

27. A method comprising a step of complexing metal atoms with a compound comprising a polymeric chain, said polymeric chain incorporating phosphorus atoms and comprising identical or different repeated units, said units being represented by the following formula (I):

(II)

wherein:
—X³ represents:
—O—[Si(R¹R²)O]— with R¹ and R² being, independently of each other, a $C_1$-$C_{30}$ alkyl group, or a $C_5$-$C_{30}$ aryl group,
a mono- or polyorganosilicate derived radical, or
—N(R³)— with R³ being —H, a $C_1$-$C_{30}$ alkyl group, or a $C_5$-$C_{30}$ aryl group, optionally substituted with —OH or —$NH_2$, or at least one unit of general formula (I), and
=X⁴ represents an electron pair, =O, =S, or =NR⁴ with R⁴ representing a $C_1$-$C_{30}$ alkyl group or a $C_5$-$C_{30}$ aryl group,
said polymeric chain is obtained according to a method comprising contacting a first reactant $P(CH_2Z)_3$, wherein each Z represents —OH, with a second reactant comprising at least two reactive sites selected from the group consisting of NH and SiOH, wherein each reactive site is capable of reacting with one first reactant,
said first reactant and said reactive sites are used in an amount equal or greater than 1 equivalent,
said second reactant is selected from $NH_2R$, with R representing a $C_1$-$C_{30}$ alkyl or alkoxy group, optionally substituted with —OH or —$NH_2$, or a $C_5$-$C_{30}$ aryl group; and a silica derivative, and
said silica derivative has the formula $SiY_nZ_p$, with n+p=4, where Y represents OH, and Z represents a radical selected from the group consisting of a $C_1$-$C_5$ alkyl group and a $C_5$-$C_{30}$ aryl group.

* * * * *